United States Patent
Hascoat

(10) Patent No.: US 12,539,785 B2
(45) Date of Patent: Feb. 3, 2026

(54) EVALUATION OF THE MAXIMUM REAL RANGE OF AN ELECTRIC VEHICLE

(71) Applicant: ELECTRICITE DE FRANCE, Paris (FR)

(72) Inventor: Aurélien Hascoat, Fontainebleau (FR)

(73) Assignee: ELECTRICITE DE FRANCE, Paris (FR)

( * ) Notice: Subject to any disclaimer, the term of this patent is extended or adjusted under 35 U.S.C. 154(b) by 778 days.

(21) Appl. No.: 17/783,995

(22) PCT Filed: Dec. 10, 2020

(86) PCT No.: PCT/EP2020/085514
§ 371 (c)(1),
(2) Date: Jun. 9, 2022

(87) PCT Pub. No.: WO2021/116280
PCT Pub. Date: Jun. 17, 2021

(65) Prior Publication Data
US 2023/0008555 A1    Jan. 12, 2023

(30) Foreign Application Priority Data

Dec. 10, 2019   (FR) .................................. FR1914081

(51) Int. Cl.
| | |
|---|---|
| *H02J 7/00* | (2006.01) |
| *B60L 53/14* | (2019.01) |
| *B60L 58/13* | (2019.01) |
| *B60L 58/14* | (2019.01) |

(Continued)

(52) U.S. Cl.
CPC ............... *B60L 58/13* (2019.02); *B60L 53/14* (2019.02); *B60L 58/14* (2019.02); *B60L 58/16* (2019.02);

(Continued)

(58) Field of Classification Search
CPC .......... B60L 58/13; B60L 58/14; B60L 58/16; B60L 53/14; B60L 2210/30; B60L 2260/52; G01R 31/367; G01R 31/392
See application file for complete search history.

(56) References Cited

U.S. PATENT DOCUMENTS

2003/0052647 A1 *  3/2003  Yoshida ................ H02J 7/0071
                                                           320/125
2012/0265397 A1    10/2012  Aliberti et al.
(Continued)

FOREIGN PATENT DOCUMENTS

| EP | 1246336 A2 | 10/2002 |
|---|---|---|
| EP | 1975636 A2 | 10/2008 |

(Continued)

OTHER PUBLICATIONS

European Examination Report issued on Jul. 15, 2024, in corresponding European Application No. 20819801.0, 12 pages.

(Continued)

*Primary Examiner* — Zixuan Zhou
(74) *Attorney, Agent, or Firm* — Maier & Maier, PLLC

(57) ABSTRACT

A method for determination of a maximum real range of an electric vehicle equipped with a battery having a variable charging state within a cycling domain. The method includes getting a first and second magnitude indicative of an electric voltage at the terminals of the battery, respectively for an initial value and for a final value of the state of charge within the cycling domain. The method further includes a predetermined demand on the battery during which the charging state of the battery varies within the cycling domain from the initial value to a final value. The method further includes determining the maximum real range of the vehicle based on an estimate of a difference between the second magnitude and the first magnitude.

14 Claims, 1 Drawing Sheet

(51) Int. Cl.
*B60L 58/16* (2019.01)
*G01R 31/367* (2019.01)
*G01R 31/392* (2019.01)

(52) U.S. Cl.
CPC ......... *G01R 31/367* (2019.01); *G01R 31/392* (2019.01); *B60L 2210/30* (2013.01); *B60L 2260/52* (2013.01)

(56) References Cited

U.S. PATENT DOCUMENTS

| | | | |
|---|---|---|---|
| 2015/0311736 A1* | 10/2015 | Park | B60L 58/21 320/103 |
| 2016/0202323 A1 | 7/2016 | Lee et al. | |
| 2019/0317150 A1 | 10/2019 | Park et al. | |

FOREIGN PATENT DOCUMENTS

| | | | |
|---|---|---|---|
| EP | 2939864 A1 | 11/2015 | |
| FR | 2811434 A1 | 1/2002 | |
| FR | 2968769 A1 | 6/2012 | |
| JP | H0488801 A | 3/1992 | |

OTHER PUBLICATIONS

International Search Report mailed on Mar. 3, 2021, in corresponding International Application No. PCT/EP2020/085514, 6 pages (with English Translation).
Office Action issued on Jun. 27, 2025, in corresponding Chinese Application No. 202080094322.0, 17 pages.

* cited by examiner

[Fig. 1]
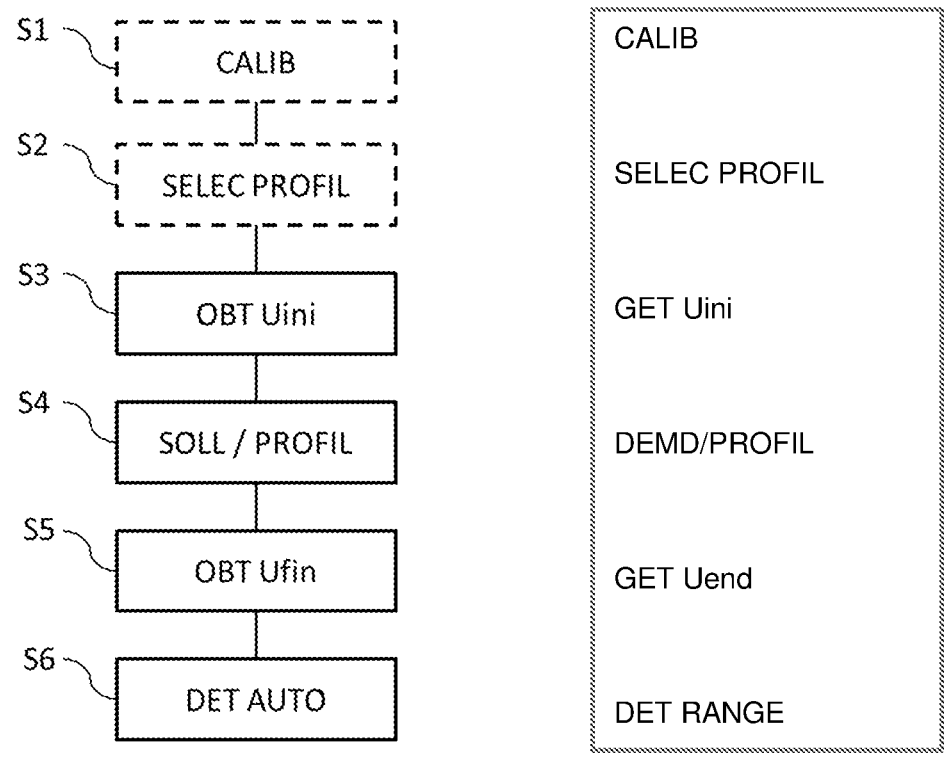
[Fig. 2]
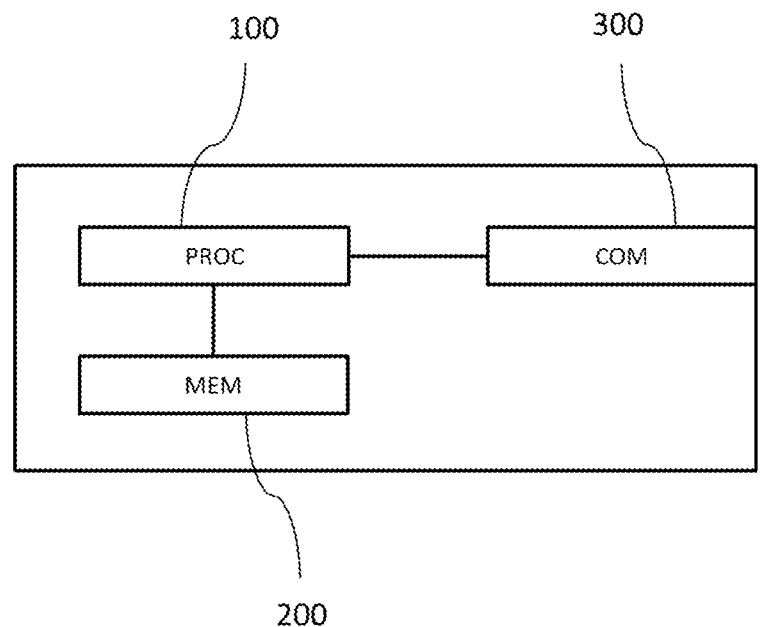

EVALUATION OF THE MAXIMUM REAL RANGE OF AN ELECTRIC VEHICLE

FIELD

The invention relates to the field of electric vehicles.

More specifically, the invention aims to estimate the state of health of an assembly of rechargeable electrochemical batteries, for example lithium-ion type, currently used in electric vehicles. This state of health is directly related to the maximum real range of this vehicle.

The invention relates to methods for determining the maximum real range of an electric vehicle, the computer programs intended to implement such methods, data storage devices storing such computer programs, and processing circuits comprising such data storage devices.

BACKGROUND

Just like any battery, the smallest element of an electric vehicle battery (or battery for any other use) is called a cell. The usual voltage of such an element of lithium-ion technology is typically included between 2.5 V and 3.4 V, with the average discharge located about 3 V. This magnitude is related to the power (expressed in watts) at which the energy can be returned. As the power extracted from the cell increases, the value of the average cell voltage drops. The electrical capacity is also an essential magnitude. This quantity is expressed in ampere-hours; it is the quantity of current that can be extracted per unit time. The quantity of energy (measured in watt-hours) is the product of the capacity and the returnable voltage during a complete or partial discharge and therefore it intrinsically sets conditions on the range of a battery system like, for example, the range of an electric vehicle (EV).

Considering the electric vehicle domain, several hundred of these cells are assembled in a complex way (pack) in order to provide the electric motor sufficient power to move the car (assembly in series) and to guarantee an EV an acceptable range (assembly in parallel).

The performance of electrochemical energy storage systems naturally shrinks with usage thereof (called cycle aging) or even without use thereof (called calendar aging). For EVs, cycle and calendar aging depend for example on the cells used, the EV usage, the climate, the location of garaging, and even the color of the vehicle which has an impact on the temperature thereof. These facts led to defining a variable called "state of health," abbreviated SOH. The unitless quantity is defined as the ratio of the real electrical energy to the nominal electrical energy.

Thus, for a new system, the real electrical energy is equivalent to the nominal energy. The SOH is 100%. For electric vehicles, this progressive loss has as a consequence of progressive and uncontrollable loss of range (predictable on average). When the range becomes unacceptable for the driver (75% SOH for the Renault Zoé), a new battery is installed on board the vehicle and the old one is sent for recycling in various forms (disassembly, recovery of parts, and then burning and recovery of metals).

The range of electric vehicles is a major factor in development of this segment of the automobile fleet. This characteristic is a marketing factor clearly identified when the vehicle is new and corresponds to a standard. The standard currently in force in Europe is the WLTP standard.

Since the market introduction of electric vehicles using lithium-ion technology more than 10 years ago (Renault Zoé, 2012; iMiev from Mitsubishi, 2009; or even other models), a used market has naturally developed. The only reference point for the user for the range corresponds to a display with the range. This information, available on the information panel, has problems because:

- the range display depends directly on the driving habits of the driver (e.g. acceleration, braking, anticipation, winding or straight road, grade, speed, payload weight, use of air conditioning, car radio, heating, tires) can be substantially different from one vendor to another and one purchaser to another; and
- this range is based on calculation algorithms established by the automobile maker which vary from one maker to another and can be subject to a drift with age. This drift is explained by the impossibility of fully discharging the drive battery (restricting the cycle window provides a notable improvement in the number of cycles that can be done).

A real advance would therefore allow in particular drivers of electric vehicles (and also used cars professionals, garages, and repair centers) to know the range of the vehicle and to be able to compare that range with other vehicles whatever the model, via a common standard, for example the WLTP standard.

In order to assure the state of health of a cell or an assembly, the only reliable measurement consists of charging the system up to the high-voltage limit (100% charged), and then to discharge the system until reaching the low-voltage limit (0% charged). The energy (or the capacity) delivered at the outcome of this test serves to determine the SOH. The life of these batteries is highly linked to the cycling domain (or cycling window).

To increase the life, the cycling window is reduced (for example between 80% and 20%). In this example, 60% of the energy is used but the aging (in particular calendar) still applies to the entirety of the battery. Hence the need to consider it. Finally, the usage profile does not allow monotonically discharging the vehicle, even over the operating range, because:

- the user does not generally use the vehicle until the discharge limit (empty); and
- energy recovery during braking recharges the battery and prevents execution of a monotonic discharge protocol.

The range may be determined by the manufacturer. However the method for determining the range requires the involvement of a specialized technician who does a complete charge and road tests. For this reason, that method involves tying up the vehicle for one or more days and is the subject of a service for which the user must pay.

SUMMARY

The present disclosure aims to improve the situation.

An aspect of the invention covers a method for determination of a maximum real range of an electric vehicle equipped with a battery having a variable charging state within a cycling domain forming a part of a nominal operating domain of the battery, where the cycling domain is associated with an operating range of the electric vehicle, the method comprising:

a) since the charging state of the battery is equal to an initial value within the cycling domain, getting a first magnitude indicative of an electric voltage at the terminals of the battery;

b) a predetermined demand on the battery, by an electric charging terminal, during which the charging state of the battery varies within the cycling domain from the initial value to a final value;

c) since the charging state of the battery is equal to the final value, getting a second magnitude indicative of an electric voltage at the terminals of the battery, and d) determining (S6) the maximum real range of the vehicle by estimating a difference between the second magnitude and the first magnitude.

Another aspect of the invention covers a computer program comprising instructions for implementing the method described above where this program is executed by a processor.

Another aspect of the invention covers a computer readable nonvolatile recording medium on which is recorded a program for implementing the method described above when this program is executed by a processor.

Another aspect of the invention, as shown in FIG. 2, covers a processing circuit comprising a processor PROC (100) connected to a nonvolatile recording medium MEM (200) described above. Such a processing circuit may for example comprise an interface for communication COM (300) with an electronic charging terminal or with a control system for one or more electric charging terminals.

The implementation of the method such as described above is purely electrical and only involves partial charging and/or discharging of the battery from an unknown and arbitrary initial state of charge. No rolling phase is required.

This implementation is thus particularly quick and does not require any prior charging or discharging phase to reach a given initial state of charge either.

Further, the determination of the maximum real range of the vehicle during the usage phase thereof according to the method such as described above is precise because it relies on magnitudes obtained which are directly related to the amount of energy returnable during a complete or partial discharge.

In fact, as indicated above, the quantity of energy is the product of the capacity of the battery and the voltage at the terminals thereof. The value of the capacity of the battery is nearly constant. The first and the second magnitudes obtained are indicative of voltages at the terminals of the battery for an initial state of charge and a final state of charge. Thus, the difference between the second magnitude and the first magnitude obtained is substantially proportional to the difference in quantity of energy returnable between these different states of charge.

Further, as indicated above, for a given state of charge, the voltage at the terminals of the battery is affected by the combination of the calendar aging and the aging from cycling of the battery. In that way, the determination of the maximum real range of the vehicle according to the method as described above simultaneously considers these two aspects of aging of the battery.

Another advantage of the method as described above is the possibility of repeating this method for example at the time of each connection of the vehicle to a charging terminal, without in that way representing a significant cause of aging by cycling. In contrast, implementing known determination processes which involve a complete charge and discharge of the battery cannot be repeated frequently without significantly impacting the life of the battery.

The determination of the maximum real range of the vehicle according to the method such as described above, repeated over time, may further serve to establish a forecast of the development to the maximum real range of the vehicle over time, in order to estimate or determine, for example, an expected date for replacement of the battery.

In an embodiment, the nominal operating domain of the battery extends between a lower nominal limit and an upper nominal limit, the cycling domain is centered on a state of charge value substantially equal to 50% of the upper nominal limit, and the cycling domain forms 50 to 80% of the nominal operating domain of the battery.

Implementing a predetermined demand exclusively in such a cycling domain serves to minimize the aging of the battery.

In an embodiment:
b1) the predetermined demand is a partial discharge which follows, for a given electric magnitude, a predetermined temporal electric profile of partial discharge associated with an estimate of a distance which the vehicle could have traveled if the partial discharge was caused by an electric consumption from the battery of the electrical vehicle; and d1) the maximum real range of the vehicle is further determined based on the distance estimate.

For example, the predetermined temporal electric profile may consider electrically a standardized consumption cycle, such as the WLTP cycle, which corresponds to a succession of a variety of standardized acceleration and braking sequences. In that way, the maximum real range of the vehicle thus determined is representative of automobile driving standardized according to a range standard (in particular WLTP).

In an embodiment:
b2) the predetermined demand is a partial charge which follows, for a given electric magnitude, a predetermined temporal electric profile of partial charge associated with an estimate of a distance which the vehicle could have traveled if a partial discharge according to a temporal electric profile inverted relative to said predetermined temporal electric profile of partial charging was caused by an electric consumption from the battery of the electrical vehicle; and d2) the maximum real range of the vehicle is further determined based on the distance estimate.

In that way, the predetermined demand may also be connected with a standardized consumption cycle, such that the maximum actual range of the vehicle determined in that way is also representative of standardized automobile driving.

Further, since the predetermined demand is a partial charge, the determination method may be incorporated in a charging phase of the vehicle's battery by the charging terminal without requiring additional time.

In an embodiment:
the charging terminal is able to deliver alternating current;
the predetermined temporal electric profile of partial charging is in direct current;
the vehicle comprises an AC/DC conversion device that has an AC/DC conversion yield, where the AC/DC conversion device is arranged so as to convert alternating current delivered by a charging terminal into direct current delivered to the battery; and
the partial charging is done by driving the charging terminal on the basis of the predetermined temporal electric profile of partial charging and the AC/DC conversion yield.

In that way, the determination method can be implemented by a charging terminal without AC/DC converter.

In an embodiment, the method further comprises:
a selection, in a database of standardized electrical profiles, of a standardized temporal electric profile obtained on the basis of at least one temporal electric profile recorded during a calibration task and indicating an electrical consumption during the calibration test by a reference battery and a reference electrical vehicle, and wherein:

the predetermined demand follows the selected standardized temporal electric profile.

In an embodiment, the reference electrical vehicle is the same model as the electric vehicle, the reference electric vehicle is equipped with an AC/DC conversion device having an AC/DC conversion yield, and the resulting standardized temporal electric profile is determined on the basis of the AC/DC conversion yield of the AC/DC conversion device of the reference electric vehicle.

In that way, it is possible to place a demand on the battery by means of the most adequate temporal electric profile, on the basis for example of the vehicle model.

In an embodiment, the resulting standardized temporal electrical profile corresponds to a charge of the battery that compensates for the discharge according to the recorded temporal electric profile.

In an embodiment, the resulting standardized temporal electric profile is accelerated relative to the recorded temporal electric profile.

In that way, the determination method can be implemented in less time. Typically, a partial charge according to a temporal electric profile over an interval shorter than one hour, preferably shorter than 30 minutes, is compatible with times for charging EV batteries by charging terminals.

If the interval is of order a few minutes, the determination method may further be done at the beginning of charging of the EV battery by the charging terminal in order for example to set the conditions for the remainder of the charge.

For example, the driver of the vehicle may wish to have a range greater than a desired value, for example 300 km, right away. On the basis of the maximum real range of the vehicle, the charging terminal may evaluate the state of charge of the battery to reach in order to achieve this objective.

In an embodiment, a), b), c) and d) are repeated for demands on the battery according to different temporal electric profiles in order to get, for each iteration, a determination of the maximum real range of the vehicle on the basis of the difference between the second magnitude obtained during said iteration and the first magnitude obtained during said iteration, and the method further comprises:

a refined determination of the maximum real range of the vehicle on the basis of the determinations resulting from each iteration.

In fact, while it is possible to determine the maximum real range of the vehicle based on a single demand on the battery, the sequencing or the combination of different demands serves to provide several successive determinations, which may undergo statistical processing with which to refine the final result of the determination and to minimize the uncertainty thereof.

In an embodiment, the method further comprises an adjustment of the operating range of the vehicle on the basis of the determination of the maximum real range.

In that way, it is for example possible to extend the life of the battery.

In an embodiment, the method further comprises generation of an alert when the determined maximum real range is below a predetermined threshold.

In that way, it is possible to inform the driver or a supplier of the need to replace the battery in anticipation of the deterioration of the maximum real range of the vehicle.

BRIEF DESCRIPTION OF THE DRAWINGS

Other characteristics, details and advantages will appear upon reading the following detailed description and on analyzing the attached drawings, on which:

FIG. 1 is a sequence diagram for a general algorithm for a computer program, in an implementation example for practicing the proposed method.

FIG. 2 schematically shows the structure of a processing circuit, in an implementation example for practicing the proposed method.

DETAILED DESCRIPTION

Now refer to FIG. 1 which shows a sample general algorithm for a computer program for implementing a sample embodiment of the proposed method.

The embodiment presented below serves to determine the real total range of any electric vehicle according to the WLTP standard or any other standard by considering the variation of the electrical properties of the battery induced by a controlled charge or discharge.

This embodiment relies on the future possibility of bidirectional exchange of electric energy between an electric vehicle and the electric distribution grid (called V2G concept for "vehicle to grid").

A calibration CALIB (S1) may be implemented in advance at least once for each vehicle model in order to populate a database.

The principle of the calibration is to perform a task comprising one or more consumption cycles (for example the WLTP cycle) on a road or on a dynamometer and to record a standardized electrical profile of demand on the battery during the one or more cycles. The recorded standardized electrical demand profile may comprise one or more of the following magnitudes:

an electrical power as a function of time P(t) during the test;
an electrical current intensity as a function of time I(t) during the test;
an electric voltage U(begin test) before the test;
an electric voltage U(end test) after the test;

and may be associated with a distance covered during the test.

By recording the electric power as a function of time P(t) during the test, the electric energy $E_{WLTP}$ consumed during the test can be determined.

By recording the electric current intensity as a function of time I(t) during the test, the capacity $C_{WLTP}$ consumed during the test can be determined.

The task may be enhanced by going through WLTP cycles until the minimum charge is reached (determining the maximum and minimum operating voltage of the battery) or by performing the test at various temperatures (using a climatic enclosure).

When a vehicle is recharged at a recharging terminal delivering alternate current (AC), the electric energy is converted into direct current (DC) in order to be able to recharge the battery. This conversion system provides a yield below 100%.

This energy yield may be defined as the ratio $E_{battery}/E_{terminal}$ between the energy stored by the battery $E_{battery}$ and the energy delivered by the terminal $E_{terminal}$.

The capacity yield may be defined as the ratio $C_{battery}/C_{terminal}$ between the capacity of the battery $C_{battery}$ and the capacity of the terminal $C_{terminal}$.

The energy yield and or the capacity yield may be determined in advance in order to check an electric demand perceived by a battery in a vehicle and to confirm that this perceived electric demand does correspond to an expected electric demand.

To do that, an AC terminal is used on the vehicle model to be calibrated by applying a profile, for example WLTP. The AC terminal electric outlet characteristics and also the inlet electrical characteristics of the battery are measured. In that way, the AC/DC converter of the electric vehicle is calibrated.

Now consider a user's electric vehicle. The electric vehicle is connected to a charging terminal delivering current which may be direct or alternating. The battery of the electric vehicle then has an unknown state of charge.

From a database of electric temporal profiles such as that obtained for example by calibration CALIB (S1) or by modeling, an electrical temporal profile may be selected SELEC PROFIL (S2) in order to put demand on the battery of the electric vehicle, by means of the charging terminal, according to the selected electric temporal profile.

The selected temporal profile corresponds to the energy or the capacity:
  to be extracted from the battery of the vehicle connected to the charging terminal; or
  to be provided to the battery of the vehicle connected to the charging terminal.

The profile may be selected on the basis of the electric vehicle model or on the basis of a characteristic of the electric vehicle, such as the engine power, influencing the consumption or range of the electric vehicle.

For example, an indication of the model of an electric vehicle connected to an electric charging terminal may be sent to an electric charging terminal control device. This indication may for example be entered by the user via a reservation terminal for the charging terminal, sent by the electric vehicle to the charging terminal through a communication network, or determined by the charging terminal by means of a sensor.

The selected electric temporal profile may be a standardized electric temporal profile, meaning acquired during a complete cycle, for example WLTP, applied to a vehicle of the same model.

In other words, the standardized electric temporal profile represents a partial discharge of the battery, more specifically the energy or the capacity consumed over a full cycle by the battery of a vehicle of the same model. The length of a standardized cycle is less than or equal to 30 minutes. In that way, the total length of the determination method can be of order 30 minutes, in this embodiment. The determination method may also be implemented during extended parking of the vehicle, of order a few hours.

The energy or capacity which might be extracted may further be injected for example into the distribution network or used for electrical needs of the electric infrastructure comprising the charging terminal.

Alternatively, the selected electrical temporal profile may be determined from said standardized electrical temporal profile.

For example, the selected electrical temporal profile may be accelerated compared to the standardized electrical temporal profile.

In other words, the selected electrical temporal profile represents a partial discharge of the battery, more specifically the energy or the capacity consumed by the battery of a vehicle of the same model over a full cycle, and corresponds to the energy and/or capacity extracted from the battery of the vehicle connected to a charging terminal in a time shortened compared to the full cycle time.

For example, the selected electrical temporal profile may be a portion of the standardized electrical temporal profile.

In other words, the selected electric temporal profile represents the energy or the capacity consumed over a portion of a full cycle by the battery of a vehicle of the same model.

By considering only a portion of the standardized electrical temporal profile or by accelerating the standardized electrical temporal profile, it is possible to determine the maximum real range of the vehicle in a reduced time compared to a consumption cycle. For example, the determination method may be implemented in a time lasting a few minutes, in this embodiment. These embodiments are compatible with a quick charge during short-term parking, such as a break of around 30 minutes to 1 hour during a long trip.

For example, the selected electrical temporal profile may be inverted compared to the standardized electrical temporal profile.

In other words, the selected temporal electric profile is a partial charge of the battery, more specifically energy or capacity to be supplied to the battery by the charging terminal. This energy or this capacity is equal in magnitude to the energy or capacity consumed by the battery during the WLTP cycle corresponding to the standardized electrical temporal profile or during a portion of this cycle.

When the selected electric temporal profile is in charge and the charging terminal delivers alternating current, the conversion yield of the vehicle may be provided in the database and considered for driving the charging terminal. In that way, applying a demand to the charging terminal may be planned, where this demand is obtained by dividing the selected demand to be applied to the battery by the conversion yield of the vehicle.

Selecting an electric temporal profile corresponding to a partial charge is an embodiment of the determination method participating in the charging of the battery of the vehicle.

Before putting demand on the battery, and for example upon connecting the electric vehicle to a charging terminal, this terminal gets GET Uini (S3), or measures, an electric voltage Uini at the terminals of the battery. The battery is then in an initial charge state.

Next, the charging terminal is driven so as to place demand DEMD/PROFIL (S4) on the battery according to the selected electric temporal profile. At the end of the demand, the battery is in a final charge state.

It is possible to measure electrical magnitudes simultaneously with the demand, such as:
  an electrical power as a function of time P(t) during the demand;
  an electrical current intensity as a function of time I(t) during the demand.

These measurements serve to verify, by comparison of signals, that the effective demand placed on the battery conforms to the selected electric temporal profile.

At the end of the demand, the charging terminal gets GET Uend (S5), or measures, an electric voltage Uend at the terminals of the batteries in the final charge state.

If the agreement is verified, the maximum real range of the vehicle is determined DET RANGE (S6) on the basis of the difference between the electric voltages at the terminals of the battery obtained in the initial and in the final state of charge.

For example, by considering that the applied electric temporal profile considers the electric consumption of a battery of a vehicle of the same model during a full WLTP cycle, the real maximum range of the vehicle may be determined by the relation:

$$d\_WLTP \times \Delta U/(U\_max - U\_min), \text{ where}$$

d_WLTP represents the distance traveled by a vehicle of the same model during a full WLTP cycle;

Umax and Umin respectively represent the maximum and minimum value among Uini and Uend (thus Umax−Umin is strictly positive), and ΔU represents the difference, strictly positive, between the reference voltages at the terminals of a new battery, meaning having a 100% state of health, SOH, when the state of charge of the new battery corresponds respectively to the upper limit and the lower limit of the cycling domain.

On the basis of the determined real maximum range, correcting usage parameters of the vehicle may be planned in order to allow optimization of the operation of the vehicle by the software limitation of the parameters having a minor impact on the service. For example, the charging current during self-consumption supporting the grid may be minimized. For example, reducing the cycling window may be planned in order to reduce the quantity of energy consumed by the electric vehicle.

Based on the determined real maximum range, a warning system with the client or supplier serving to alert them to the need to replace the battery in anticipation of degrading service may be implemented.

The present disclosure is not limited to the embodiments described above, only as examples, but it encompasses all the variants which a person skilled in the art could conceive in the scope of the protection sought.

For example, instead of reading the voltage of the terminals of the battery before and after a charging demand or discharging demand applied to the battery, reading the voltage terminals of the battery may be planned before and after a sequence of several phases of charging or discharging demand applied to the battery.

According to another example:
various phases of charging or discharging demand are successively applied to the battery;
before and after each demand phase, the voltages at the terminals of the battery are measured or read; and
for each demand phase, an individual determination of the maximum real range is done on the basis of the voltages measured or read just before and just after said phase.

The resulting individual determinations respectively for each phase may for example undergo statistical processing and/or be used for supporting machine learning, in order to get a final determination of the maximum real range of the vehicle.

This final determination benefits from improved precision and uncertainty compared to each individual determination.

The invention claimed is:

1. A method for determining a maximum real range of an electric vehicle equipped with a battery, the method comprising:
a) applying, via an electric charging terminal external to the vehicle, a predetermined demand on the battery, the predetermined demand being defined by a temporal electrical profile representative of an energy consumption scenario of the vehicle;
b) measuring a first magnitude indicative of an electric voltage at the terminals of the battery before applying the predetermined demand;
c) measuring a second magnitude indicative of an electric voltage at the terminals of the battery after applying the predetermined demand, wherein a state of charge of the battery varies within a cycling domain forming part of a nominal operating domain of the battery; and
d) determining the maximum real range of the vehicle by computing a difference between the second magnitude and the first magnitude.

2. The method according to claim 1, wherein:
the nominal operating domain of the battery extends between a lower nominal limit and an upper nominal limit;
the cycling domain is centered on a state of charge value substantially equal to 50% of the upper nominal limit; and
the cycling domain forms 50 to 80% of the nominal operating domain of the battery.

3. The method according to claim 1, wherein:
b1) the predetermined demand is a partial discharge which follows, for a given electric magnitude, a predetermined temporal electric profile of partial discharge associated with an estimate of a distance which the vehicle could have traveled if the partial discharge was caused by an electric consumption from the battery of the electrical vehicle; and
d1) the maximum real range of the vehicle is further determined based on the distance estimate.

4. The method according to claim 1, wherein:
b2) the predetermined demand is a partial charge which follows, for a given electric magnitude, a predetermined temporal electric profile of partial charge associated with an estimate of a distance which the vehicle could have traveled if a partial discharge according to a temporal electric profile inverted relative to said predetermined temporal electric profile of partial charging was caused by an electric consumption from the battery of the electrical vehicle; and
d2) the maximum real range of the vehicle is further determined based on the distance estimate.

5. The method according to claim 4, wherein:
the charging terminal is able to deliver alternating current;
the predetermined temporal electric profile of partial charging is in direct current;
the vehicle comprises an AC/DC conversion device that has an AC/DC conversion yield, where the AC/DC conversion device is arranged so as to convert alternating current delivered by a charging terminal into direct current delivered to the battery; and
the partial charging is done by driving the charging terminal on the basis of the predetermined temporal electric profile of partial charging and the AC/DC conversion yield.

6. The method according to claim 3, comprising:
a selection, in a database of standardized electrical profiles, of a standardized temporal electric profile obtained on the basis of at least one temporal electric profile recorded during a calibration task and indicating an electrical consumption during the calibration test by a reference battery and a reference electrical vehicle, and wherein:
the predetermined demand follows the selected standardized temporal electric profile.

7. The method according to claim 6, wherein:
the resulting standardized temporal electrical profile corresponds to a charge of the battery that compensates for the discharge according to the recorded temporal electric profile.

8. The method according to claim 6, wherein:
the resulting standardized temporal electric profile is accelerated relative to the recorded temporal electric profile.

9. The method according to claim 8, wherein:
the reference electrical vehicle is the same model as the electric vehicle;
the reference electric vehicle is equipped with an AC/DC conversion device having an AC/DC conversion yield; and
the resulting standardized temporal electric profile is determined on the basis of the AC/DC conversion yield of the AC/DC conversion device of the reference electric vehicle.

10. The method according to claim 1, wherein, a), b), c) and d) are repeated for demands on the battery according to different temporal electric profiles in order to get, for each iteration, a determination of the maximum real range of the vehicle by estimation of the difference between the second magnitude obtained during said iteration and the first magnitude obtained during said iteration, and the method further comprises:
a refined determination of the maximum real range of the vehicle on the basis of the determinations resulting from each iteration.

11. The method according to claim 1, comprising:
an adjustment of the operating range of the vehicle on the basis of the determined maximum real range.

12. The method according to claim 1, comprising:
generation of an alert when the determined maximum real range is below a predetermined threshold.

13. A non-transitory computer readable nonvolatile recording medium on which is recorded a program for implementing the method according to claim 1, when this program is executed by a processor.

14. A processing circuit comprising a processor connected to a nonvolatile recording medium according to claim 13.

* * * * *